US006776508B2

(12) United States Patent
Bucher et al.

(10) Patent No.: US 6,776,508 B2
(45) Date of Patent: Aug. 17, 2004

(54) LANDSCAPING FIXTURES WITH COLORED LIGHTS

(75) Inventors: John C. Bucher, Ft. Lauderdale, FL (US); Charles E. Bucher, Valrico, FL (US)

(73) Assignee: King of Fans, Inc., Ft. Lauderdale, FL (US)

( * ) Notice: Subject to any disclaimer, the term of this patent is extended or adjusted under 35 U.S.C. 154(b) by 0 days.

(21) Appl. No.: 10/150,765

(22) Filed: May 15, 2002

(65) Prior Publication Data

US 2003/0137844 A1 Jul. 24, 2003

Related U.S. Application Data

(60) Provisional application No. 60/351,268, filed on Jan. 23, 2002.

(51) Int. Cl.$^7$ .................................................. F21V 9/00
(52) U.S. Cl. ...................... 362/293; 362/174; 362/277; 362/283; 362/284; 362/431; 362/321; 362/323; 362/280; 362/806; 362/35
(58) Field of Search ................................. 362/293, 174, 362/277, 282, 283, 284, 431, 321, 322, 323, 280, 806, 35; 40/433

(56) References Cited

U.S. PATENT DOCUMENTS 1,744,485 A * 1/1930 Michel et al. ................ 356/30
4,048,493 A * 9/1977 Lee ............................. 250/205
5,073,847 A * 12/1991 Bornhorst .................... 362/293
5,297,013 A * 3/1994 Hall et al. .................... 362/363
5,448,455 A * 9/1995 Ryan ............................ 362/557

FOREIGN PATENT DOCUMENTS

EP          0565218 A2 * 10/1993     ............. F21P/5/02

* cited by examiner

Primary Examiner—Stephen Husar
Assistant Examiner—Sharon Payne
(74) Attorney, Agent, or Firm—Holland & Knight LLP

(57) ABSTRACT

A landscaping light fixture including a housing containing a lamp such as an incandescent lamp or LED, that produces light when powered, a lens through which light from the passes and a multi-colored wheel, strip or shutter juxtapositioned between the lamp and lens such that the light emitted from the lamp shines through the color wheel, strip or shutter and then through the lens, the wheel, strip or shutter including a translucent material of different segmented color or of a graduated color and being operatively positioned within the housing of the landscaping light fixture to be movable to align the colored segment or graduation of the wheel, strip or shutter into alignment with the lamp such that the light emitted from the lamp shines through the color wheel, strip or shutter prior to shining through the lens assembly.

10 Claims, 4 Drawing Sheets

LANDSCAPING FIXTURES WITH COLORED LIGHTS

CROSS-REFERENCE TO RELATED APPLICATIONS

This invention claims the benefit of provisional application number 60/351,268, filed Jan. 23, 2002, the disclosure of which is hereby incorporated by reference herein.

BACKGROUND OF THE INVENTION

1. Field of the Invention

This invention relates to outdoor lighting. More particularly, this invention relates to outdoor lighting for landscaping.

2. Description of the Background Art

Outdoor lighting fixtures are well known. In the outdoor lighting and landscaping arts, it is customary to illuminate and delineate pathways, driveways, sidewalks, patios, plant beds, lawns and the like with outdoor lighting. Such lighting is typically used to provide illumination for practical as well as decorative purposes, including highlighting landscaping and various architectural features of various improvements. Presently, there exists a variety of outdoor lighting fixtures of a variety of embodiments employing various power sources (hard-wired, solar-powered, etc.)

Typically, outdoor lighting fixtures comprise a lamp that emits "white" illumination. Some lamps, such as those employing light-emitting diodes ("LED"), emit light of a specific wavelength to produce a specific color (e.g. "red"). Still other light fixtures employ colored lenses designed to allow only light of a specific wavelength to shine therethrough to thereby produce illumination of a specific color (e.g. "red"). Unfortunately, whether due to the illuminated light from the lamp or through the use of colored lenses, the color of the light emitted by the light fixtures remains fixed, and cannot be changed or varied except by replacing the lamp or the lens to one of a different color.

Some attempts have been made to provide a light fixture that provides illumination of different colors. One commonly-known type of a light fixture employs a rotating color wheel that is mounted in front of the lamp of the light fixture such that the white light being emitted therefrom shines through the colored segments of the color wheel as it rotates in front of the light fixture. The use of the rotating light wheel in combination with the light fixture sequentially produces light of different colors as determined by the colored segment of the light wheel that rotates into position in front of the lamp of light fixture. Unfortunately, such light wheels are not adaptable for use in conjunction with landscaping light fixtures due to the configuration of the landscaping fixtures that typically project the light through a cylindrical lens and then downwardly toward the driveway, path, etc. to be illuminated.

Therefore, it is an object of this invention to provide an improvement which overcomes the aforementioned inadequacies of the prior art devices and provides an improvement which is a significant contribution to the advancement of the landscaping art.

Another object of this invention is to provide multi-colored landscaping light fixtures that produce light of different colors.

Another object of this invention is to provide landscaping light fixtures that produce different colored illumination.

Another object of this invention is to provide landscaping light fixtures that allow the consumer to easily and quickly change the color of the illuminated light therefrom.

Another object of this invention is to provide landscaping light fixtures that employ a color wheel, strip or shutter that is specially configured to be operatively positioned within conventional-styled landscaping light fixtures that project light through the lens thereof to be reflected downwardly for illumination of the surrounding landscaping.

The foregoing has outlined some of the pertinent objects of the invention. These objects should be construed to be merely illustrative of some of the more prominent features and applications of the intended invention. Many other beneficial results can be attained by applying the disclosed invention a different manner or modifying the invention within the scope of the disclosure. Accordingly, other objects and a fuller understanding of the invention may be had by referring to the summary of the invention and the detailed description of the preferred embodiment in addition of the scope of the invention defined by the claims taken in conjunction with the accompanying drawings.

SUMMARY OF THE INVENTION

For the purpose of summarizing this invention, this invention comprises a landscaping light fixture that produces light of many different colors as selected easily and quickly by a consumer. More particularly, the landscaping light fixture of the invention comprises a housing containing a lamp such as an incandescent lamp or LED, that produces light when powered. The housing further includes a lens that refracts the light from the lamp to shine in the desired direction. A multi-colored wheel, strip or shutter is juxtapositioned between the lamp and the lens such that the light emitted from the lamp shines through the color wheel, strip or shutter and then through the lens. The color wheel, strip or shutter functions to filter the light from the lamp to allow light of a particular wavelength to shine therethrough thereby producing color light of the desired wavelength.

The color wheel, strip or shutter of the invention includes a translucent material of different segmented colors or of a graduated color.

The color wheel, strip or shutter of the invention is operatively positioned within the housing of the landscaping light fixture to be movable to align the colored segment or graduation of the wheel, strip or shutter into alignment with the lamp such that the light emitted from the lamp shines through the color wheel, strip or shutter prior to shining through the lens assembly.

Once the landscaping light fixtures of the invention are installed as desired along the driveway, pathway, etc., they can all be set to illuminate the color "white" in a conventional manner. For added landscaping effects, one or more of the landscaping light fixtures could be set to illuminate a specific color by the consumer by simply moving the color wheel, strip or shutter such that the desired portion thereof of the particular color is moved into alignment with the lamp of the light fixture.

Using the invention, the landscaping possibilities are endless. For example, walkways leading to the residence's front door can be illuminated with white light whereas walkways to the garage could be illuminated with the color yellow. Walkways along a seawall could be illuminated with a red color for increased safety. The borders of flower beds could be illuminated with a blue color to accent the colors of the flowers themselves. During holidays, some or all of the light fixtures could be set to illuminate colors representative of the particular holiday season. For example, red could be used predominately for Christmas, orange for Halloween and pink for Easter. Patterns could be designed such as the colors red, white and blue for patriotic holidays such as Memorial Day.

The foregoing has outlined rather broadly the more pertinent and important features of the present invention in order that the detailed description of the invention that follows may be better understood so that the present contribution to the art can be more fully appreciated. Additional features of the invention will be described hereinafter which form the subject of the claims of the invention. It should be appreciated by those skilled in the art that the conception and the specific embodiment disclosed may be readily utilized as a basis for modifying or designing other structures for carrying out the same purposes of the present invention. It should also be realized by those skilled in the art that such equivalent constructions do not depart from the spirit and scope of the invention as set forth in the appended claims.

BRIEF DESCRIPTION OF THE DRAWINGS

For a fuller understanding of the nature and objects of the invention, reference should be had to the following detailed description taken in connection with the accompanying drawings in which.

Similar reference characters refer to similar parts throughout the several views of the drawings.

DETAILED DESCRIPTION OF THE PREFERRED EMBODIMENT

Figure 1:
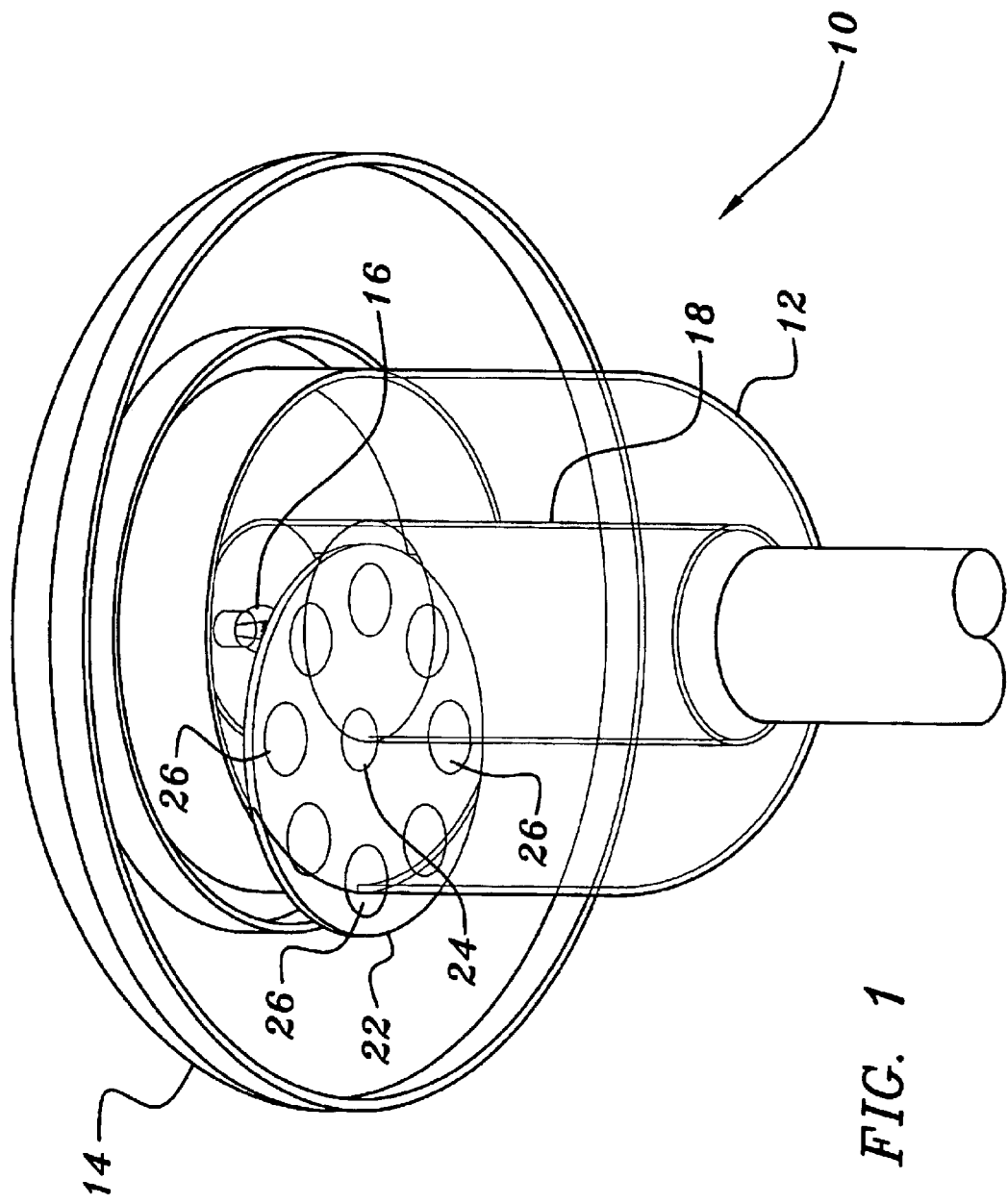
FIG. 1 is a perspective view of the underside of the landscaping fixture of the invention.

As shown in FIG. 1, the landscaping light fixture 10 of the invention comprises in its preferred form, a generally cylindrical transparent or translucent shade 12 having a generally dome-shaped reflector hood 14. A lamp 16 is positioned within the underside of the reflector hood 14. The lamp 16 may comprise any type of device that provides illumination. Representative examples may include filament lamps, light emitting diode (LED) lamps, or fluorescent lamps. Lamp 16 may be powered electrically by any suitable means such as being hard-wired to conventional household current or by being solar-powered through the use of storage batteries or the like.

A generally cylindrical lens 18 is positioned concentrically about the lamp 16 to the underside of the reflector hood 14 inside the shade 12 by means of mounting lugs 20 that allow the lens 18 to be snap-fitted thereto. Lens 18 may comprise many different types of embodiments as desired to direct, diffuse and disperse the illumination from the lamp 16 into the desired directions. In the most preferred embodiment of the invention, lens 18 is preferably designed to direct the illumination from the lamp 16 to illuminate through the lens 18 in a uniform manner about its entire periphery to exit the shade 12.

It is noted that the lens 18 may be incorporated into the lumen or outer surface of the shade 12 as an integral unit. It is also noted that the shade 12 may be frosted to function as a lens to further diffuse the light emitted therethrough. Hence, the term "lens" as used herein and in the claims is broadly defined to include lenses or shades through which the light from the lamp passes.

Figure 2:
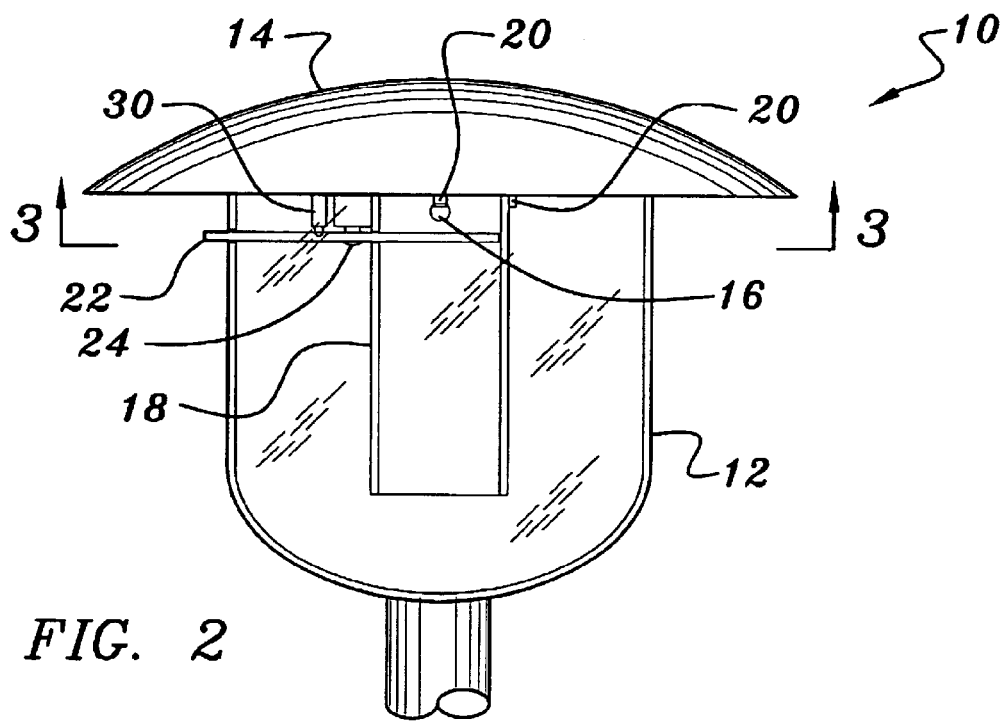
FIG. 2 is a side elevational view of the landscaping fixture of the invention showing the positioning of the color wheel between the lamp and the lens assembly of the fixture.
Figure 3:
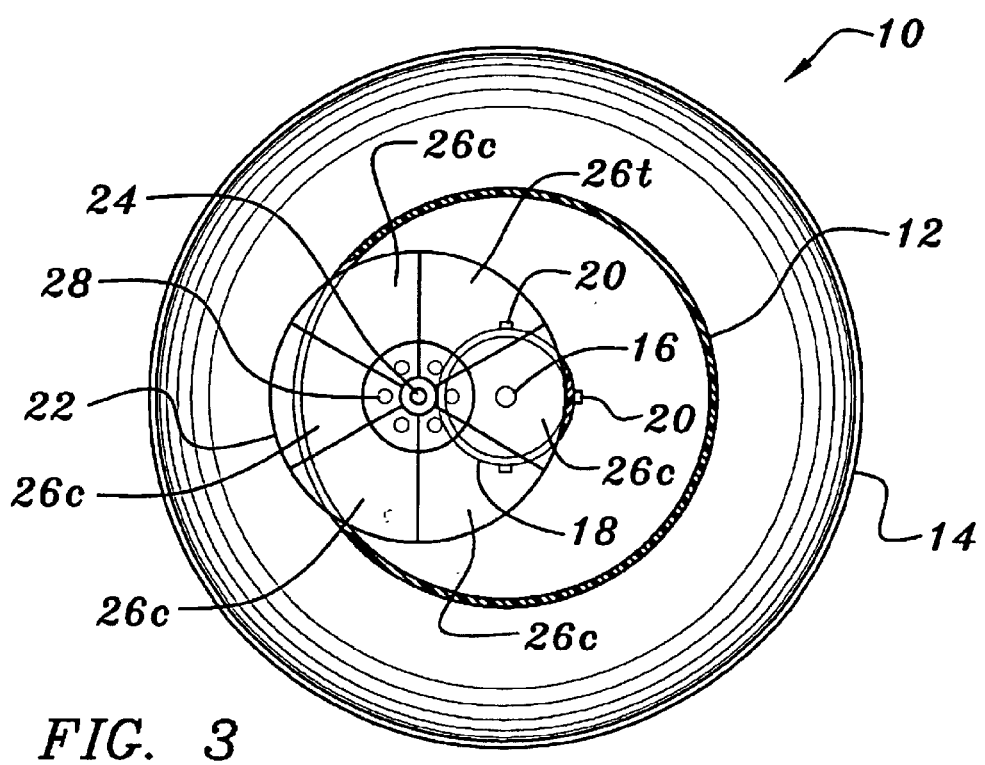
FIG. 3 is a cross-sectional view of FIG. 2 along lines 3—3 showing the relative positioning of the color wheel and lamp such that illumination from the lamp shines through the color wheel to produce light of the desired color.

As shown in FIG. 2, the light fixture 10 of the invention further comprises a color wheel 22 which is operatively positioned between the lamp 16 and the lens 18. As shown in FIG. 3, the color wheel 22 preferably comprises a generally cylindrical configuration that is operatively positioned to the underside of the reflector hood 14 by means of an axle 24 extending therefrom that allows the wheel 22 to rotate thereon.

The color wheel 22 preferably comprises a plurality of color segments 26, one of which is transparent 26T and the others of which are colored translucent 26C. Alternatively, color wheel 22 may comprise a transparent/translucent material that includes a clear transparent portion and a graduated color portion extending across all wavelengths of visible color in a rainbow fashion.

Finally, color wheel 22 may further comprise a plurality of indentations positioned about its periphery for cooperative engagement with a spring-loaded detent 30 formed in the reflector hood 14 such that the wheel 22 will not be indexed and free-wheel to inadvertently rotate to a different color.

Figure 4:
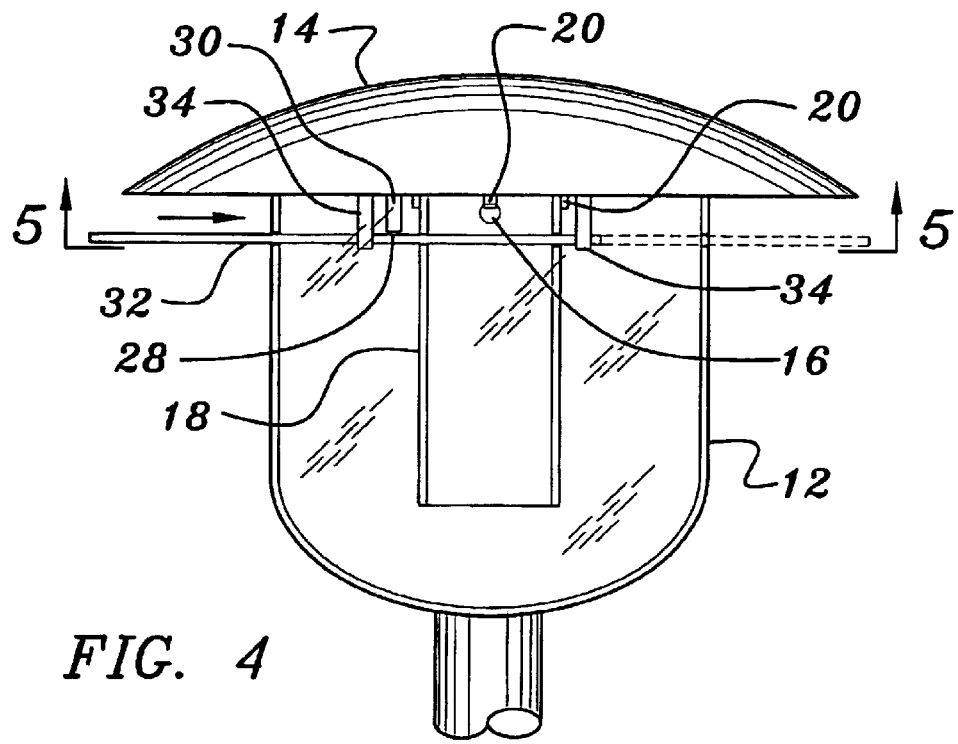
FIG. 4 is a partial side elevational view of the second embodiment of the landscaping fixture of the invention that employs a color strip.
Figure 5:
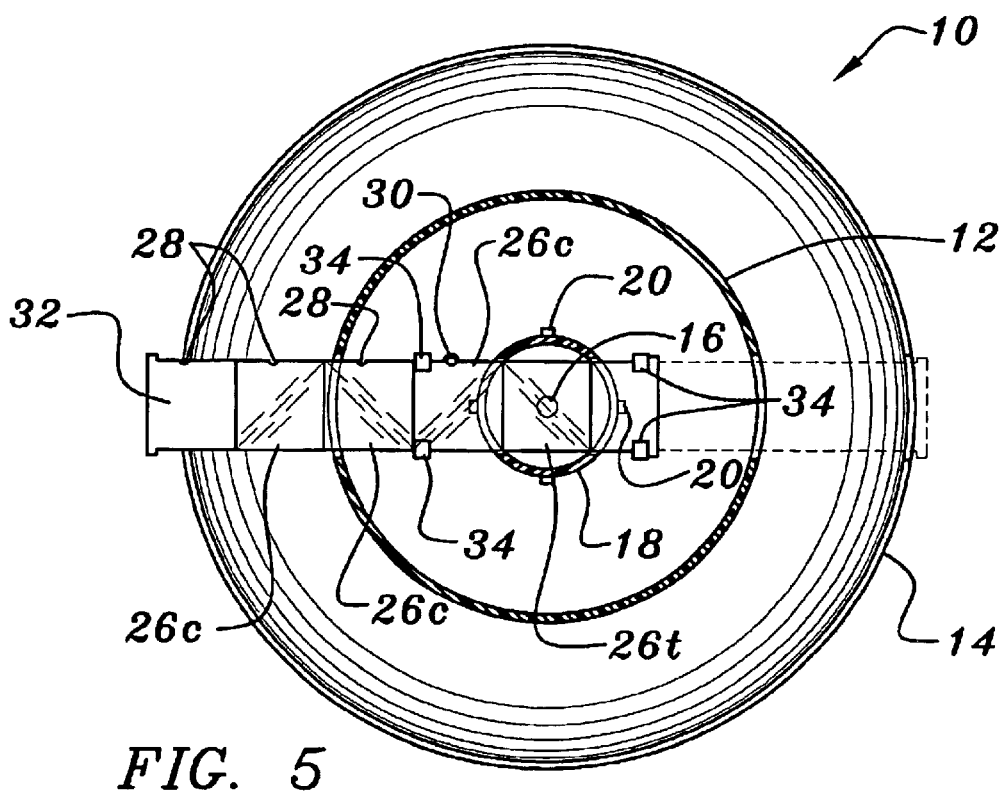
FIG. 5 is a cross-sectional view of FIG. 4 along lines 5—5 showing the relative positioning of the color strip and lamp such that illumination from the lamp shines through the color strip to produce light of the desired color.

Referring now to FIGS. 4 and 5, the second embodiment of the landscaping fixture of the invention employs the use of a color strip 32 in lieu of the color wheel 22 employed in the first embodiment as described above in connection with FIGS. 1–3. In the second embodiment, the color strip 32 comprises a generally rectangular configuration having the differently configured segments 26 similar to that described above in connection with the color wheel 22. The strip 32 is supported in a position proximate to the lamp 16 by opposing rails 34 that allow the strip 32 to reciprocate inwardly and outwardly such that the desired segment 26 can be positioned immediately under the lamp 16. In this regard, similar to the color wheel 22, the strip 32 may comprise a plurality of indentations 28 positioned on one or both of its side edges for cooperative engagement with a spring-loaded detent 30 formed in the reflector hood 14 such that the strip 32 can be resiliently positioned in indexed positions with the desired segment 26 being positioned immediately under the lamp 16. Finally, it is noted that the strip 32 may be made so as to be removable, thus allowing different strips 32 with other varieties of color segments 26 to be installed as desired.

Figure 6:
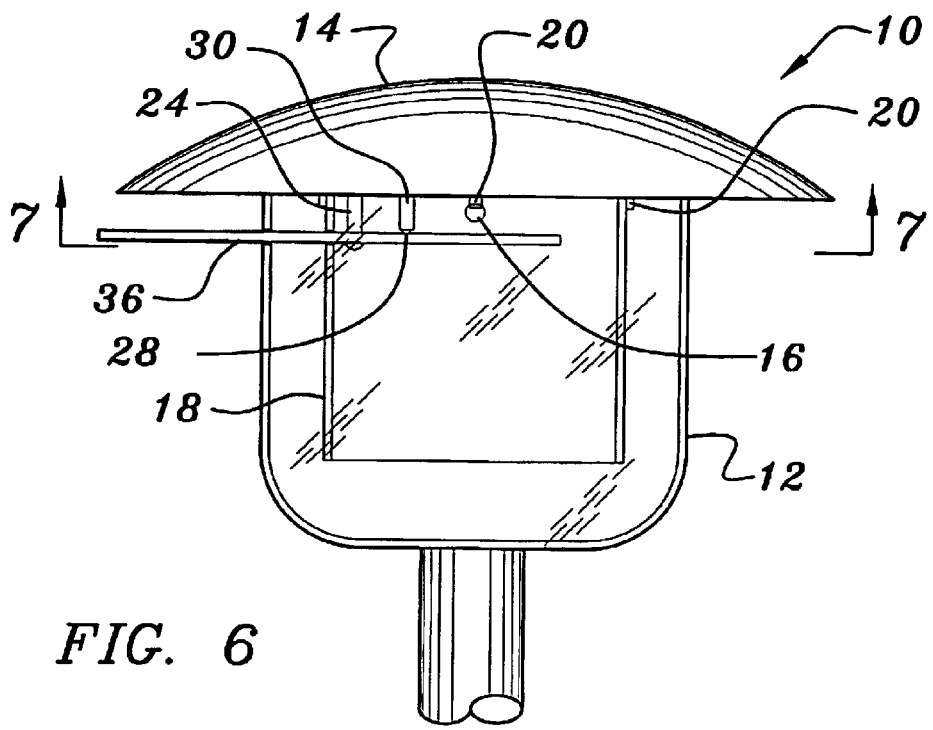
FIG 6. is a partial side elevational view of the second embodiment of the landscaping fixture of the invention that employs a color shutter.
Figure 7:
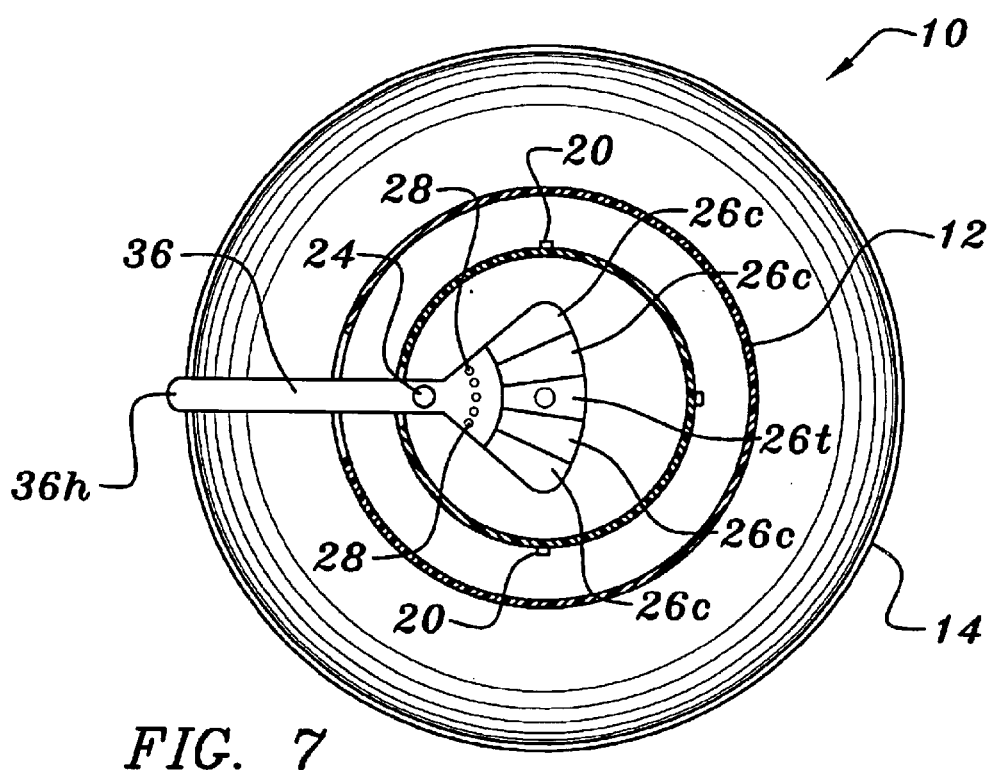
FIG 7. is a cross-sectional view of FIG. 4 along lines 5—5 showing the relation positioning of the color shutter and lamp such that illumination from the lamp shines through the color shutter to produce light of the desired colors.

Referring now to FIG. 6 and 7, the third embodiment of the light fixture 10 of the invention employs the use of a color shutter 36 in lieu of the color strip 32 of the second embodiment and the color wheel 22 of the first embodiment. Similar to the first embodiment, in this third embodiment, the shutter 36 is pivotally secured to the underside of the reflector hood 14 by means of an axle 24. The shutter 36 itself comprises a generally fan-shaped configuration at one end with a plurality of colored segments 26 extending across the fan-portion 36F thereof. The shutter 36 further comprises a handle portion 36H which extends in an opposite direction to a position outside of the lens 18. With the axle 24 being appropriately dimensioned relative to the lamp 16, it is seen that upon movement of the handle 36H of the shutter 36, the fan portion 36F thereof containing the colored segments 26 is selectively moved into alignment with the lamp 16. As in the case of the first and second embodiments, the shutter 36 may include a plurality of indentations 28 which are cooperative with a detent 30 to provide an indexing of the colored segments 26 relative to the lamp 16 to assure proper alignment of the desired segment 26 with the lamp 16.

The present disclosure includes that contained in the appended claims, as well as that of the foregoing description. Although this invention has been described in its preferred form with a certain degree of particularity, it is understood that the present disclosure of the preferred form has been made only by way of example and that numerous changes in the details of construction and the combination and arrangement of parts may be resorted without departing from the spirit and scope of the invention.

Now that the invention has been described, what is claimed is:

1. A landing light fixture comprising, in combination:
   a housing including a reflector hood; said housing containing a lamp that produces light when powered, said lamp being positioned under said reflector hood such that said light is reflected downwardly away from said reflector hood to illuminate the surrounding landscape in which the landscaping light fixture may be installed;
   a lens through which light from the lamp passes; and
   a multi-colored member juxtapositioned between the lamp and the lens such that the light emitted from the lamp shines through the member, and then through the lens, the member, including a translucent material of different segmented colors or of a graduated color and being operatively positioned within the housing of the landscaping light fixture to be movable to align the color segment or graduation of the member, into alignment with the lamp such that the light emitted from the lamp shines through the member, prior to shining through the lens assembly.

2. The landscaping fixture as set forth in claim 1, wherein said member comprises a multi-colored wheel.

3. The landscaping fixture as set forth in claim 2, wherein said wheel comprises a generally circular configuration operatively secured into position by means of an axle that allows the desired colored segment of said wheel to be aligned with said lamp.

4. A landscaping light fixture comprising, in combination:
   a housing containing a lamp that produces light when powered;
   a lens through which light from the lamp passes; and
   a multi-colored member juxtapositioned between the lamp and the lens such that the light emitted from the lamp shines through the member and then through the lens, the member including a translucent material of different segmented colors or of a graduated color and being operatively positioned with in the housing of the landscaping light fixture to be movable to align the colored segment or graduation of the member into alignment with the lamp such that the light emitted from the lamp shines through the member prior to shining through the lens assembly, said member comprising a multi-colored wheel comprising a generally circular configuration operatively secured into position by means of an axle that allows the desired colored segment of said wheel to be aligned with said lamp, said wheel further comprising an index to allow indexing of said colored segments of said wheel relative to said lamp.

5. The landscaping fixture as set forth in claim 1, wherein said member comprises a colored shutter.

6. A landscaping light fixture comprising, in combination:
   a housing containing a lamp that produces light when powered;
   a lens through which light from the lamp passes; and
   a multi-colored member juxtapositioned between the lamp and the lens such that the light emitted from the lamp shines through the member and then through the lens, the member including a translucent material of different segmented colors or of a graduated color and being operatively positioned with in the housing of the landscaping light fixture to be movable to align the colored segment or graduation of the member into alignment with the lamp such that the light emitted from the lamp shines through the member prior to shining through the lens assembly, said member comprising a colored shutter, said shutter comprising a generally arcuate configuration operatively secured into position by means of an axle that allows the desired colored segment of said shutter to be aligned with said lamp.

7. The landscaping light fixture as set forth claim 6, wherein said shutter further comprises an indexing of said colored segments of said shutter relative to said lamp.

8. The landscaping fixture as set forth in claim 1, wherein said member comprises a strip.

9. The landscaping fixture as set forth in claim 8, wherein said strip further comprises a generally rectangular configuration operatively secured into position in selective alignment with said lamp.

10. A landscaping light fixture comprising, in combination:
    a housing containing a lamp that produces light when powered;
    a lens through which light from the lamp passes; and
    a multi-colored member juxtapositioned between the lamp and the lens such that the light emitted from the lamp shines through the member and then through the lens, the member including a translucent material of different segmented colors or of a graduated color and being operatively position within the housing of the landscaping light fixture to be movable to align the colored segment or graduation of the member into alignment with the lamp such that the light emitted from the lamp shines through the member prior to shining through the lens assembly, said member comprising a strip comprising a generally rectangular configuration operatively secured into position in selective alignment with said lamp, said strip further comprising an index to allow indexing of said colored segments of said wheel relative to said lamp.

\* \* \* \* \*